United States Patent
Loewe et al.

(10) Patent No.: US 9,982,742 B2
(45) Date of Patent: May 29, 2018

(54) VIBRATION DAMPER

(71) Applicant: Illinois Tool Works Inc., Glenview, IL (US)

(72) Inventors: Hubert Loewe, Weselberg (DE); Juergen Hofmann, Eisenberg (DE); Markus Elsner, Kaiserslautern (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days. days.

(21) Appl. No.: 14/096,112

(22) Filed: Dec. 4, 2013

(65) Prior Publication Data

US 2014/0159289 A1   Jun. 12, 2014

(30) Foreign Application Priority Data

Dec. 6, 2012 (DE) .......... 10 2012 111 866

(51) Int. Cl.
| | |
|---|---|
| *F16L 3/237* | (2006.01) |
| *F16F 13/04* | (2006.01) |
| *F16F 1/373* | (2006.01) |
| *H02G 3/32* | (2006.01) |
| *B60R 16/02* | (2006.01) |
| *F16L 55/035* | (2006.01) |

(52) U.S. Cl.
CPC .......... *F16F 13/04* (2013.01); *B60R 16/0215* (2013.01); *F16F 1/373* (2013.01); *H02G 3/32* (2013.01); *F16F 2226/041* (2013.01); *F16L 55/035* (2013.01)

(58) Field of Classification Search
CPC ... F16F 13/04; F16F 7/104; F16L 3/13; F16L 55/035; F16L 3/237; F16L 3/24; F16B 21/02
USPC ...... 267/140, 140.3, 140.4, 141, 141.4, 292, 267/293, 136; 188/378, 379
See application file for complete search history.

(56) References Cited

U.S. PATENT DOCUMENTS

| | | | | |
|---|---|---|---|---|
| 3,894,706 | A | * | 7/1975 | Mizusawa .................... 248/68.1 |
| 4,450,605 | A | * | 5/1984 | Schaty ............................ 24/457 |
| 4,467,988 | A | * | 8/1984 | Kraus .......................... 248/68.1 |
| 5,039,040 | A | * | 8/1991 | Idjakiren ......................... 248/73 |
| 5,129,607 | A | * | 7/1992 | Satoh ............................. 248/73 |
| 5,316,247 | A | | 5/1994 | Wodka |

(Continued)

FOREIGN PATENT DOCUMENTS

| | | |
|---|---|---|
| CN | 1475689 | 2/2004 |
| CN | 201568642 | 9/2010 |

(Continued)

OTHER PUBLICATIONS

Translation of Abstract for CN 201568642.
Translation of Abstract for CN 1475689.

*Primary Examiner* — Thomas W Irvin
(74) *Attorney, Agent, or Firm* — Joseph M. Butscher; The Small Patent Law Group, LLC

(57) ABSTRACT

In a vibration damper (10) for at least one conduit (12, 12*a*, 12*b*), in particular in a vehicle, with at least one receptacle (14, 14*a*, 14*b*) in which a conduit (12, 12*a*, 12*b*) can be held, and a frame (16) in which the receptacle (14, 14*a*, 14*b*) is held and which encloses the receptacle (14, 14*a*, 14*b*) in circumferential direction (U), it is provided that the frame (16) is flexible and/or that flexible webs (18*a*, 18*b*, 18*c*, 18*d*, 18*e*, 18*f*) are provided, which keep the receptacle (14, 14*a*, 14*b*) spaced from the frame (16).

15 Claims, 2 Drawing Sheets

(56) References Cited

U.S. PATENT DOCUMENTS

| | | | |
|---|---|---|---|
| 5,464,179 A * | 11/1995 | Ruckwardt | 248/68.1 |
| 5,588,683 A * | 12/1996 | Schliessner | 285/62 |
| 5,618,015 A * | 4/1997 | Morini | 248/74.2 |
| 5,731,359 A * | 3/1998 | Moser | F16F 1/37 267/140.11 |
| 5,947,426 A * | 9/1999 | Kraus | 248/74.2 |
| 6,371,419 B1 * | 4/2002 | Ohnuki | 248/74.2 |
| 6,585,196 B2 * | 7/2003 | Nakanishi | 248/68.1 |
| 6,641,093 B2 * | 11/2003 | Coudrais | F16L 3/13 248/68.1 |
| 7,036,775 B2 * | 5/2006 | Nakanishi | 248/68.1 |
| 7,240,880 B2 * | 7/2007 | Benoit et al. | 248/65 |
| 7,267,307 B2 * | 9/2007 | Bauer | F16L 55/035 248/65 |
| 7,404,548 B2 * | 7/2008 | Kwilosz | 267/140.13 |
| 7,614,589 B2 * | 11/2009 | Kato | 248/55 |
| 7,712,708 B2 * | 5/2010 | Clark | 248/74.4 |
| 7,748,689 B2 * | 7/2010 | Thibault et al. | 267/140.12 |
| 7,918,828 B2 * | 4/2011 | Lundgaard et al. | 604/174 |
| 8,056,868 B2 * | 11/2011 | Vander Griend | 248/74.2 |
| D679,177 S * | 4/2013 | Craig et al. | D8/395 |
| 9,004,416 B2 * | 4/2015 | Ogawa | F16L 3/13 24/530 |
| 2002/0063189 A1 | 5/2002 | Coudrais | |
| 2005/0098688 A1 * | 5/2005 | Miarka et al. | 248/68.1 |
| 2007/0284485 A1 * | 12/2007 | Kato | 248/68.1 |
| 2009/0026673 A1 * | 1/2009 | Clark et al. | 267/140.11 |
| 2009/0166489 A1 * | 7/2009 | Volchko | 248/205.1 |
| 2010/0116947 A1 * | 5/2010 | Winkler | 248/73 |
| 2010/0155545 A1 * | 6/2010 | Birli et al. | 248/70 |
| 2012/0009012 A1 * | 1/2012 | Allenbach et al. | 403/344 |
| 2012/0128410 A1 * | 5/2012 | Naoi | 403/291 |
| 2012/0153095 A1 * | 6/2012 | Child et al. | 248/68.1 |
| 2012/0298811 A1 * | 11/2012 | Ogawa | F16L 3/13 248/74.3 |
| 2013/0009020 A1 * | 1/2013 | Shirakabe et al. | 248/74.1 |
| 2013/0320182 A1 * | 12/2013 | Kataoka et al. | 248/562 |
| 2014/0070070 A1 * | 3/2014 | Shinoda | 248/634 |

FOREIGN PATENT DOCUMENTS

| | | |
|---|---|---|
| DE | 1946244 | 3/1971 |
| DE | 34 40 995 | 5/1986 |
| DE | 9401393 | 6/1994 |
| DE | 4428520 | 2/1996 |
| DE | 100 58 528 | 5/2002 |
| DE | 10306904 | 8/2004 |
| GB | 1 258 386 | 12/1971 |
| GB | 2 166 794 | 5/1986 |

* cited by examiner

VIBRATION DAMPER

BACKGROUND OF THE INVENTION

This invention relates to a vibration damper for at least one conduit, in particular in a vehicle, with at least one receptacle in which the conduit can be held, and a frame in which the receptacle is held and which encloses the receptacle in circumferential direction.

For laying conduits, for example cables, in vehicles, conduit holders are provided, which hold the conduits vehicle-fixed at regular intervals. Between such conduit holders, the conduit possibly can vibrate freely, whereby the conduit can strike against the vehicle body. This can lead to an undesired generation of noise or to damages. The reduction of the distances of the conduit holders, in order to prevent the conduits from vibrating, frequently is not possible or not expedient for cost reasons.

To reduce the generation of noise during vibration of these conduits, vibration dampers therefore are provided on the conduits between the conduit holders, which on the one hand effect a change in the vibration behavior due to an increase of the mass of the conduit. On the other hand, these vibration dampers are made of a soft material, whereby striking of the conduit against a solid object, for example the vehicle body, can be damped.

Such vibration dampers usually are made of a two-component plastic material, with a receptacle for the conduit of a hard plastic, in which the conduit can safely be held. For damping purposes, this receptacle is overmolded with a soft plastic, which has a good damping behavior. The manufacture of such vibration dampers, however, is very costly and expensive.

SUMMARY OF THE INVENTION

It is the object of the invention to provide a vibration damper for at least one conduit, which has improved damping properties and can be manufactured at lower cost.

For the solution of this object, a vibration damper is provided for at least one conduit, in particular in a vehicle, with at least one receptacle in which a conduit can be held, and a frame in which the receptacle is held and which encloses the receptacle in circumferential direction, wherein the frame is flexible and/or flexible webs are provided, which keep the receptacle spaced from the frame. The frame encloses the receptacle in circumferential direction, so that during vibrations the frame gets in contact with solid components, for example the car body. For damping vibrations or the striking against the car body, the frame on the one hand is flexible, so that the same can be deformed during a contact and thus can absorb shocks. On the other hand, flexible webs are provided between frame and receptacle, which provide for a limited movement of the receptacle relative to the frame. These webs thereby have an additional damping function. The receptacle is uncoupled from the frame, so to speak, so that the frame can abut against the car body, but shocks and vibrations on the receptacle are reduced.

Preferably, the webs extend with a curvature from the frame to the receptacle, so that the same can yield in a spring-like manner when the frame gets in contact with the car body. The webs for example can have mirror-symmetrical curvatures with respect to a main vibration direction or an axis of symmetry of the vibration damper, so that no further transversal force is exerted onto the conduit or the vibration damper due to such springing back and the damping properties are improved in this direction.

Preferably, an insertion opening for the conduit is provided at the vibration damper, which is formed by an interruption of the frame and the receptacle. As a result, it is also possible to subsequently mount the vibration damper on a conduit, in that the conduit is inserted into the receptacle through the insertion opening.

The edges of the interruptions of the frame and the receptacle preferably are connected with each other by flexible webs, so that these webs additionally have the function of an insertion bevel or centering aid for the conduit when inserting the conduit through the insertion opening.

The flexible webs at the edges of the interruptions of the frame and the receptacle for example are curved such that the same narrow the insertion opening. For inserting the conduit, the webs can yield flexibly and subsequently again narrow the insertion opening such that the conduit can be prevented from slipping out of the receptacle.

In the conduit, however, fixing protrusions for the conduit can also be provided, in order to prevent the conduit from slipping out of the receptacle. These fixing protrusions can be formed by latching elements, at which the conduit is locked into place.

At the vibration damper, at least two receptacles can also be provided, wherein for each receptacle a separate insertion opening is provided and between the receptacles webs are provided, which hold the receptacles spaced from each other. Frequently, several conduits are laid in parallel, wherein one vibration damper can be used for several conduits. The same additionally can hold the individual conduits spaced from each other, so that the conduits cannot touch each other or strike against each other. To ensure this, the webs between the receptacles preferably are formed such that the same do not spring or spring only slightly, so that the conduits can reliably be kept spaced from each other. For example, this can be effected in that these webs are not curved. All receptacles can be arranged in a common frame, which is arranged to extend around all receptacles, so that all receptacles and thus all conduits are protected by the frame against striking against the vehicle body.

The vibration damper preferably is made of a flexible plastic, in particular of a thermoplastic elastomer. In particular, the vibration damper is manufactured by a one-component injection molding method, i.e. the vibration damper is made of a single material, so that only one injection operation is required.

BRIEF DESCRIPTION OF THE DRAWINGS

Further advantages and features can be found in the following description in conjunction with the attached drawings, in which.

DESCRIPTION OF EMBODIMENTS

Figure 1:
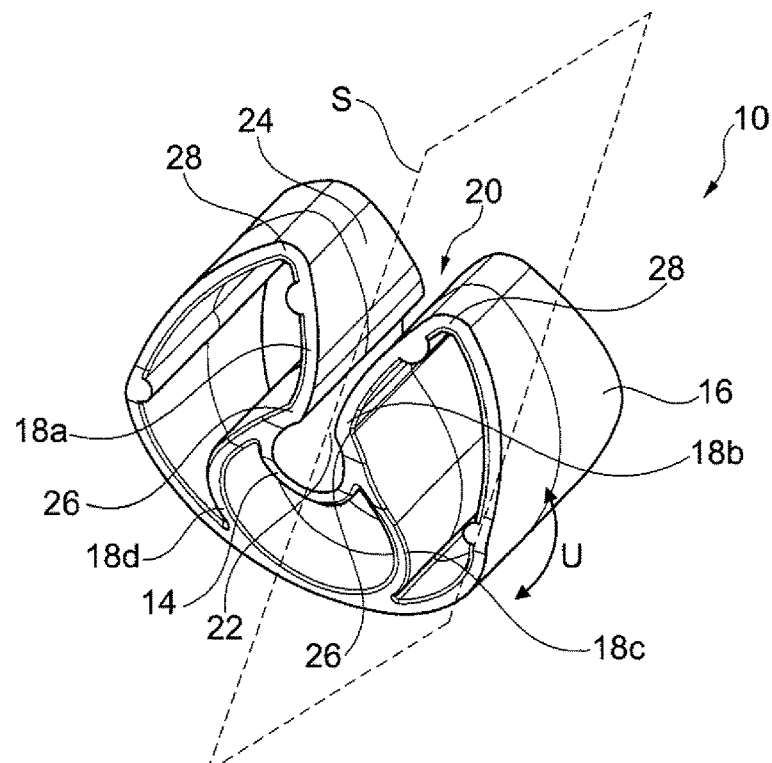
FIG. 1 shows a first embodiment of a vibration damper according to the invention.
Figure 2:
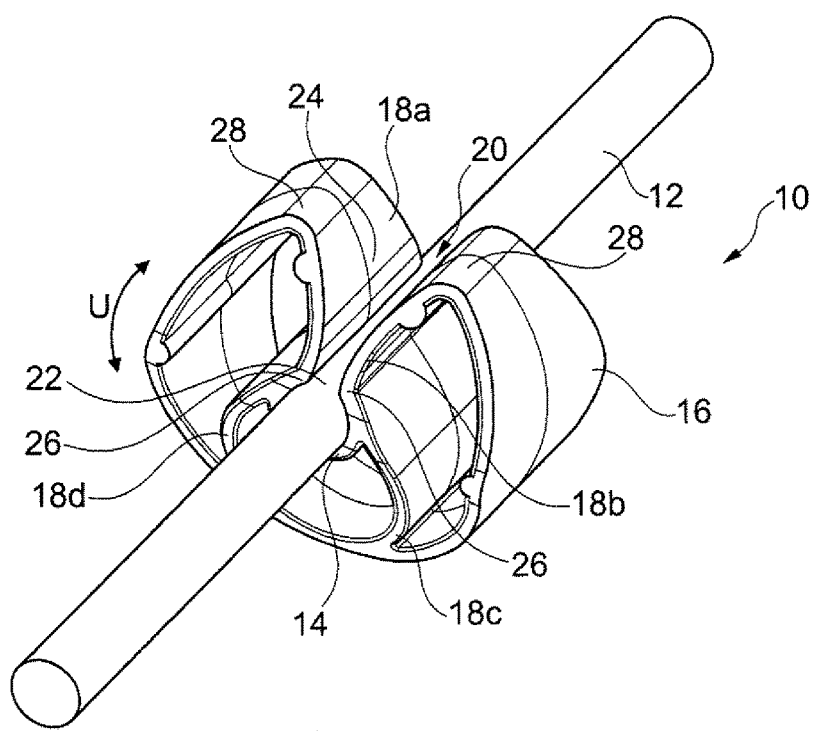
FIG. 2 shows the vibration damper of FIG. 1 with a conduit.

FIGS. 1 and 2 show a vibration damper 10 for a conduit 12 (see FIG. 2). The vibration damper 10 has the function to prevent or attenuate a vibration of the conduit 12 or to prevent striking of the conduit 12 against the vehicle body, in that on striking against the vehicle body the vibration damper 10 prevents or absorbs shocks on the conduit 12.

The vibration damper 10 has a receptacle 14 into which the conduit 12 can be inserted and be fixed in the same (see FIG. 2). Furthermore, the vibration damper 10 has a frame 16 which encloses the receptacle 14 in a circumferential direction U. Between frame 16 and receptacle 14 a plurality of webs 18a, 18b, 18c, 18d are provided, which define the position of the receptacle 14 in the frame 16 and by which the receptacle 14 is kept spaced from the frame 16.

The vibration damper 10 is made in one piece of a flexible plastic, for example of a thermoplastic elastomer (TPE), wherein the vibration damper 10 preferably is injection-molded by a one-component injection molding method.

To be able to insert the conduit 12 into the receptacle 14, an insertion opening 20 is provided, which is formed by interruptions 22, 24 in the frame 16 and in the receptacle 14, respectively. In the embodiment shown here, the edges 26, 28 of the interruptions 22, 24 are connected with each other by two webs 18a, 18b, so that the webs 18a, 18b form an insertion bevel for the conduit 12.

As can be seen in FIGS. 1 and 2, the webs 18a, 18b, 18c, 18d extend with a curvature from the receptacle 14 to the frame 16, so that the same can yield in an elastically resilient manner. The webs 18a, 18b which define the insertion opening 20 each are concavely curved towards the insertion opening 20, so that the same narrow the insertion opening 20. The webs 18c, 18d likewise are curved mirror-symmetrically with respect to a plane of symmetry S.

The conduit 12 can be inserted into the receptacle 14 through the insertion opening 20, wherein the webs 18a, 18b can yield flexibly and thus clear the insertion opening 20. When the conduit 12 is inserted into the receptacle 14, the webs 18a, 18b spring back into the starting position, in which the insertion opening 20 is narrowed to such an extent that the conduit 12 cannot slip out of the same, whereby the vibration damper 10 is safely fixed at the conduit 12.

Instead of the flexible webs 18a, 18b, however, other structures for fixing the conduit in the receptacle 14 can also be provided, for example fixing protrusions, in particular latching elements.

Due to the greater mass of the vibration damper 10, the vibration behavior of the conduit 12 is changed on the one hand. On the other hand, if the conduit 12 vibrates, the vibration damper 10 first gets in contact with a car body or another component and thus prevents striking of the conduit.

Since the frame 16 is flexible, the same can be deformed elastically on striking against the car body and thus can absorb or prevent shocks on the conduit 12. In addition, the flexible webs 18a, 18b, 18c, 18d can be deformed flexibly and thus additionally absorb shocks on the conduit 12. By the webs 18a, 18b, 18c, 18d the receptacle 14 is uncoupled from the frame, so to speak, so that shocks on the frame 16 are not passed on to the receptacle 14 and hence not to the conduit 12.

As can be seen in particular in FIG. 2, the vibration damper 10 almost completely encloses the conduit 12 in circumferential direction U, so that independent of the vibration direction an attenuation of the shock or the striking against the vehicle body is effected.

Since the vibrations and shocks on the conduit 12 are reduced, a reliable protection of the conduit 12 is ensured. Since the vibration damper 10 also is able to flexibly cushion or attenuate shocks and vibrations, the generation of noise is distinctly lower in operation of the vehicle.

Figure 3:
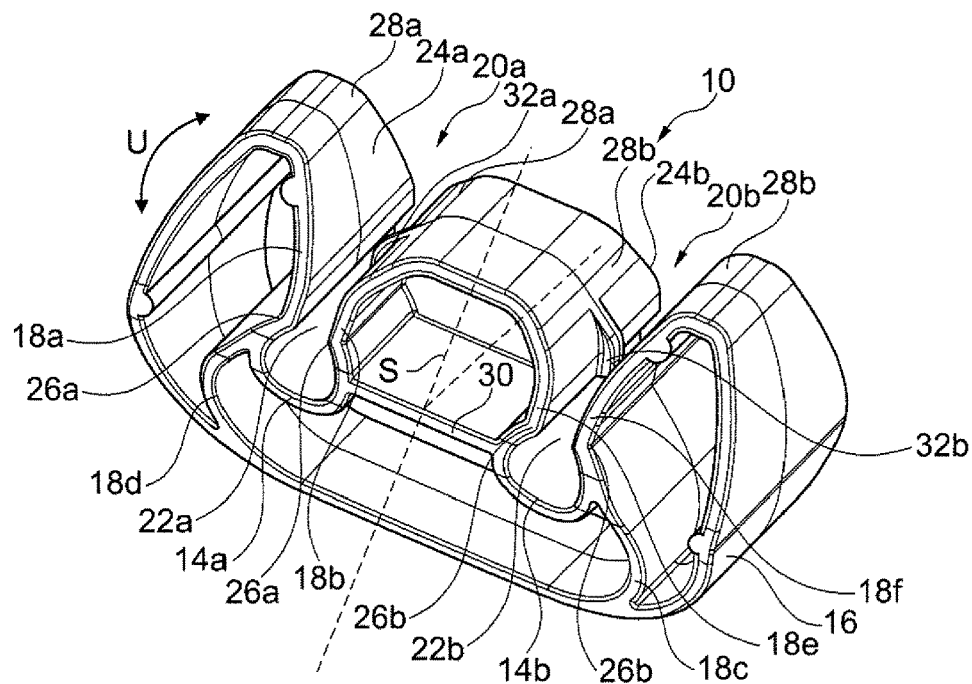
FIG. 3 shows a second embodiment of the vibration damper according to the invention.
Figure 4:
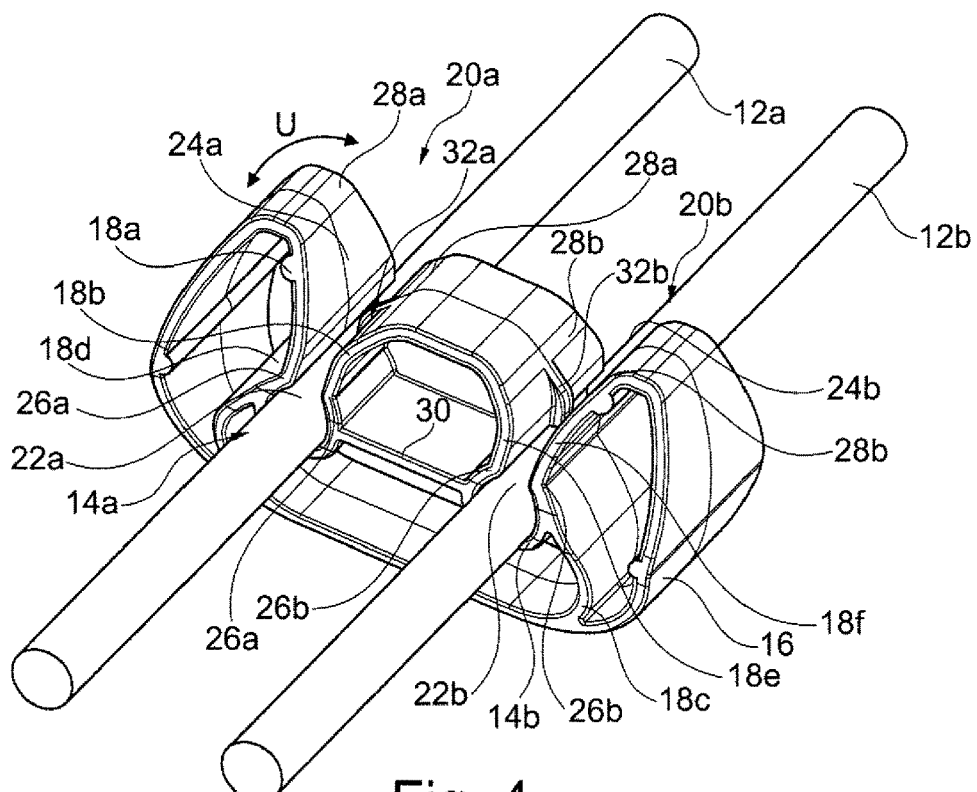
FIG. 4 shows the vibration damper of FIG. 3 with two inserted conduits.

A second embodiment of a vibration damper 10 according to the invention is shown in FIGS. 3 and 4. This vibration damper 10 has two receptacles 14a, 14b which each include separate insertion openings 20a, 20b. Both receptacles 14a, 14b are held in a common frame 16 and kept spaced from each other by a web 30.

This web 30 is formed straight, so that the same cannot yield or can yield only with a slight resilience, whereby the conduits 12a, 12b can safely be kept spaced from each other.

The structure of the remaining vibration damper 10 substantially corresponds to the vibration damper 10 shown in FIGS. 1 and 2, wherein in this embodiment a total of six webs 18a to 18f are provided. Two webs 18a, 18b, 18e, 18f each connect the edges 26a, 26b and 28a, 28b of the interruptions 22a, 22b, 24a, 24b with each other and thus define the insertion openings 20a, 20b. The two remaining webs 18c, 18d are pre-bent axially symmetrically with respect to a plane of symmetry.

The number and positioning as well as the shape of the webs can, however, also be adapted as desired to the mounting conditions or the desired damping properties.

In addition, fixing protrusions 32a, 32b are provided at the insertion openings 20a, 20b, which additionally can fix the conduits 12a, 12b in the receptacles 14a, 14b. The fixing protrusions 32a, 32b are held at the webs 18a, 18b, 18e, 18f, so that the same can yield flexibly together with the webs 18a, 18b, 18e, 18f for inserting the conduits 12a, 12b.

The fixing protrusions 32a, 32b however also can include latching elements, which as such can yield flexibly and can clear the insertion openings 20a, 20b.

Since in this embodiment, too, the conduits 12, 12a, 12b are enclosed by the frame 16 approximately completely in circumferential direction U, striking of the conduits 12, 12a, 12b against a vehicle-fixed object, for example the vehicle body, is reliably prevented.

Through the insertion openings 20, 20a, 20b, the vibration damper 10 also can be mounted subsequently to conduits 12, 12a, 12b already installed in a vehicle.

Preferably, the frame 16 is formed round or oval and has no corners or protrusions, so that in circumferential direction U a good damping is provided when striking against the vehicle body, and getting stuck or jamming at a vehicle-fixed object is excluded.

The invention claimed is:

1. A vibration damper that is configured to retain conduits, comprising:
   first and second receptacle members that are curved to define respective first and second receptacles for holding the conduits within the first and second receptacles,
   a straight web having a linear shape that extends between and connects to both of the first and second receptacle members to space apart the first and second receptacle members;
   a flexible frame at least partially enclosing the first and second receptacles, wherein an outer surface of the flexible frame is continuous, wherein an entirety of the outer surface of the flexible frame is configured to directly abut against a vehicle body; and
   flexible webs extending from the first and second receptacle members to the flexible frame to space the first and second receptacle members from the flexible frame, wherein each of the flexible webs is curved and extends from a first end of the flexible web connected to the flexible frame to a second end of the flexible web connected to one of the first and second receptacle members, the flexible webs configured to flexibly deform to dampen vibrations between the frame and the first and second receptacles, wherein a first pair of the flexible webs is above the straight web and defines an insertion opening for the first receptacle through which one of the conduits is inserted into the first receptacle, a second pair of the flexible webs is above the straight web and defines an insertion opening for the second receptacle through which another of the conduits is inserted into the second receptacle, and a third pair of the flexible webs is below the straight web.

2. The vibration damper of claim 1, wherein the flexible webs in the first pair are concavely curved towards each other so as to narrow the insertion opening for the first receptacle along a direction in which the conduit is inserted into the first receptacle.

3. The vibration damper of claim 1, wherein the flexible webs in the third pair are convexly curved away from each other.

4. The vibration damper of claim 1, wherein one of the flexible webs in the third pair extends from the first receptacle member to the flexible frame and the other of the flexible webs in the third pair extends from the second receptacle member to the flexible frame.

5. A vibration damper comprising:
a receptacle member that is curved to define a receptacle, the receptacle member configured to retain a conduit within the receptacle;
a flexible frame at least partially enclosing the receptacle in a circumferential direction, the flexible frame elastically deforming to dampen vibration and prevent shocks from being transmitted between the flexible frame and the conduit within the receptacle;
flexible webs that extend from the receptacle member to the frame to space the receptacle from the frame, each of the flexible webs having a first end connected to the receptacle member and a second end connected to the frame, the flexible webs configured to flexibly deform to dampen vibration, the flexible webs being curved mirror symmetrically with respect to a plane of symmetry, wherein two of the flexible webs on opposite sides of the plane of symmetry define first pair, and another two of the flexible webs on opposite sides of the plane of symmetry define a second pair, wherein the flexible webs in the first pair are concavely curved towards each other and the flexible webs in the second pair are convexly curved away from each other, and
an insertion opening through which the conduit enters the receptacle, the insertion opening being defined by the first pair of the flexible webs, the insertion opening including at least one fixing protrusion extending from at least one of the flexible webs of the first pair into the insertion opening, wherein the at least one fixing protrusion is configured to engage the conduit to retain the conduit within the receptacle.

6. A vibration damper configured to retain a conduit of a vehicle, the vibration damper comprising:
a flexible frame having a continuous outer surface, wherein an entirety of the outer surface of the frame is configured to directly abut against a vehicle body;
a receptacle member that is curved to define a receptacle within the frame, wherein the receptacle member is configured to retain the conduit within the receptacle, wherein the frame at least partially encloses the receptacle in a circumferential direction;

flexible webs that extend from the receptacle member to the frame to space the receptacle from the frame, each of the flexible webs having a first end connected to the receptacle member and a second end connected to the frame, wherein the flexible webs are curved between the first and second ends and configured to flexibly deform to dampen vibration and prevent vibrations from being transmitted between the receptacle and the frame; and an insertion opening that is configured to receive the conduit, wherein the insertion opening is formed by a first interruption of the frame and a second interruption of the receptacle member, wherein edges of the first and second interruptions are connected by a first pair of the flexible webs, wherein the flexible webs in the first pair are concavely curved towards each other, and the flexible webs in a second pair of the flexible webs are convexly curved away from each other.

7. The vibration damper according to claim 6, wherein the flexible webs extend with a curvature along entire lengths thereof from the first ends at the receptacle member to the second ends at the frame.

8. The vibration damper according to claim 6, wherein the first pair of the flexible webs that are concavely curved towards each other narrow the insertion opening between the edges of the first and second interruptions.

9. The vibration damper according to claim 6, wherein the receptacle is a first receptacle of at least two receptacles with separate insertion openings for separate conduits, wherein the at least two receptacles are commonly held together in the frame and spaced apart by at least one web, wherein the at least one web is formed straight to ensure that the separate conduits are spaced apart.

10. The vibration damper according to claim 6, wherein the vibration damper is made of a flexible plastic.

11. The vibration damper according to claim 6, further comprising fixing protrusions extending from the first pair of the flexible webs into the insertion opening, wherein the fixing protrusions are configured to engage the conduit.

12. The vibration damper according to claim 11, wherein the fixing protrusions are configured to retain the conduit in the receptacle.

13. The vibration damper according to claim 6, wherein the insertion opening is defined by the first pair of the flexible webs, the conduit being inserted into the receptacle through the insertion opening.

14. The vibration damper according to claim 6, wherein the receptacle is a first receptacle of two receptacles spaced apart from one another by a straight web, the two receptacles configured to receive different conduits.

15. The vibration damper according to claim 6, wherein the frame at least partially surrounds the flexible webs.

* * * * *